(12) United States Patent
Fuschetto et al.

(10) Patent No.: US 10,619,584 B2
(45) Date of Patent: Apr. 14, 2020

(54) DYNAMIC VALVE CONTROL IN A SKIP FIRE CONTROLLED ENGINE

(71) Applicant: Tula Technology, Inc., San Jose, CA (US)

(72) Inventors: Jerry F. Fuschetto, Bay Point, CA (US); Matthew A. Younkins, Campbell, CA (US); Ihab S. Soliman, Washington, MI (US); Mark Wilcutts, Berkeley, CA (US)

(73) Assignee: Tula Technology, Inc., San Jose, CA (US)

( * ) Notice: Subject to any disclaimer, the term of this patent is extended or adjusted under 35 U.S.C. 154(b) by 152 days.

(21) Appl. No.: 15/982,406

(22) Filed: May 17, 2018

(65) Prior Publication Data

US 2018/0266347 A1    Sep. 20, 2018

Related U.S. Application Data

(63) Continuation-in-part of application No. 15/171,931, filed on Jun. 2, 2016, now Pat. No. 10,012,161, and
(Continued)

(51) Int. Cl.
*F02D 41/00* (2006.01)
*F02D 13/06* (2006.01)
(Continued)

(52) U.S. Cl.
CPC ......... *F02D 41/0087* (2013.01); *F02D 13/06* (2013.01); *F02D 41/0085* (2013.01);
(Continued)

(58) Field of Classification Search
CPC ............. F02D 13/0207; F02D 13/0211; F02D 13/0215; F02D 13/0219; F02D 13/0223; F02D 13/0226; F02D 13/023; F02D 13/0234; F02D 13/0238; F02D 13/06; F02D 41/0085; F02D 41/0087; F02D 2041/0012;
(Continued)

(56) References Cited

U.S. PATENT DOCUMENTS

| 4,434,767 A | 3/1984 | Kohama et al. |
| 4,489,695 A | 12/1984 | Kohama et al. |

(Continued)

FOREIGN PATENT DOCUMENTS

| WO | WO 2010/006311 | 1/2010 |
| WO | WO 2011/085383 | 7/2011 |

OTHER PUBLICATIONS

International Search Report and Written Opinion dated Sep. 14, 2018 from International Application No. PCT/US2018/033221.
(Continued)

*Primary Examiner* — Erick R Solis
(74) *Attorney, Agent, or Firm* — Beyer Law Group LLP

(57) ABSTRACT

Various methods and arrangements for improving fuel economy and noise, vibration, and harshness (NVH) in a skip fire controlled engine are described. An engine controller dynamically selects a gas spring type for a skipped firing opportunity. Determination of the skip/fire pattern and gas spring type may be made on a firing opportunity by firing opportunity basis.

38 Claims, 9 Drawing Sheets

Related U.S. Application Data a continuation-in-part of application No. 15/282,308, filed on Sep. 30, 2016, now abandoned.

(60) Provisional application No. 62/508,020, filed on May 18, 2017, provisional application No. 62/353,772, filed on Jun. 23, 2016.

(51) Int. Cl.
  *F02D 41/12* (2006.01)
  *F02D 41/14* (2006.01)
  *F02D 13/02* (2006.01)

(52) U.S. Cl.
  CPC ........ *F02D 41/123* (2013.01); *F02D 13/0207* (2013.01); *F02D 41/1406* (2013.01); *F02D 2041/0012* (2013.01); *F02D 2041/1412* (2013.01); *F02D 2041/1433* (2013.01); *F02D 2200/1004* (2013.01); *F02D 2250/18* (2013.01); *Y02T 10/18* (2013.01)

(58) Field of Classification Search
  CPC ..... F02D 2041/1412; F02D 2200/1004; F02D 2250/18
  USPC .................................................. 701/110, 112
  See application file for complete search history.

(56) References Cited

U.S. PATENT DOCUMENTS

| | | |
|---|---|---|
| 4,509,488 A | 4/1985 | Forster et al. |
| 5,377,631 A | 1/1995 | Schechter |
| 5,467,748 A | 11/1995 | Stockhausen |
| 6,158,411 A | 12/2000 | Morikawa |
| 6,619,258 B2 | 9/2003 | McKay et al. |
| 7,063,062 B2 | 6/2006 | Lewis et al. |
| 7,066,136 B2 | 6/2006 | Ogiso |
| 7,086,386 B2 | 8/2006 | Doering |
| 7,503,312 B2 | 3/2009 | Surnilla et al. |
| 7,577,511 B1 | 8/2009 | Tripathi et al. |
| 7,930,087 B2 | 4/2011 | Gibson et al. |
| 8,099,224 B2 | 1/2012 | Tripathi et al. |
| 9,086,020 B2 | 7/2015 | Tripathi et al. |
| 9,120,478 B2 | 9/2015 | Carlson et al. |
| 9,175,613 B2 | 11/2015 | Parsels et al. |
| 9,212,610 B2 | 12/2015 | Chen et al. |
| 9,267,454 B2 | 2/2016 | Wilcutts et al. |
| 9,399,964 B2 | 7/2016 | Younkins et al. |
| 9,562,470 B2 | 2/2017 | Younkins et al. |
| 9,581,097 B2 | 2/2017 | Younkins et al. |
| 9,784,644 B2 | 10/2017 | Chen et al. |
| 9,790,867 B2 | 10/2017 | Carlson et al. |
| 9,835,522 B2 | 12/2017 | Chen et al. |
| 9,890,732 B2 | 2/2018 | Younkins et al. |
| 10,060,368 B2 | 8/2018 | Pirjaberi et al. |
| 10,121,161 B2 | 11/2018 | Parris |
| 10,493,836 B2 * | 12/2019 | Serrano ................. F16F 15/121 |
| 2010/0050993 A1 | 3/2010 | Zhao et al. |
| 2010/0100299 A1 | 4/2010 | Tripathi et al. |
| 2014/0090623 A1 | 4/2014 | Beikmann |
| 2014/0277999 A1 * | 9/2014 | Switkes .............. F02D 13/0219 701/102 |
| 2016/0024981 A1 | 1/2016 | Parsels et al. |
| 2016/0116371 A1 | 4/2016 | Chen et al. |
| 2017/0370308 A1 | 12/2017 | Hashemi et al. |
| 2018/0230919 A1 | 8/2018 | Nagashima et al. |
| 2019/0003443 A1 * | 1/2019 | Ortiz-Soto ............. F02P 5/045 |

OTHER PUBLICATIONS

International Preliminary Report on Patentability dated Oct. 11, 2019 from International Application No. PCT/US2018/033221.

\* cited by examiner

DYNAMIC VALVE CONTROL IN A SKIP FIRE CONTROLLED ENGINE

CROSS-REFERENCE TO RELATED APPLICATIONS

The present application claims the priority of U.S. Provisional Patent Application No. 62/508,020 (P064P), filed May 18, 2017. This application is also a Continuation-in-Part of U.S. patent application Ser. No. 15/171,931 (P052), filed Jun. 2, 2016 and Ser. No. 15/282,308 (P056), filed Sep. 30, 2016. U.S. patent application Ser. No. 15/282,308 in turn claims priority of Provisional Application No. 62/353,772, filed Jun. 23, 2016. Each of the foregoing priority applications is incorporated herein by reference in its entirety.

FIELD OF THE INVENTION

The present invention relates generally to operation of an internal combustion engine under skip fire control. Various embodiments relate to changing the timing of cylinder intake and exhaust events to form different types of gas springs within the engine's cylinders.

BACKGROUND

Most vehicles in operation today (and many other devices) are powered by internal combustion (IC) engines. An internal combustion engine typically has a reciprocating piston which oscillates within a cylinder. Combustion occurs within the cylinder and the resulting torque is transferred by the piston through a connecting rod to a crankshaft. For a four-stroke engine, air, and in some cases fuel, is inducted to the cylinder through an intake valve and exhaust combustion gases are expelled through an exhaust valve. In typical engine operation, the cylinder conditions vary in a cyclic manner, encountering, in order, an intake, compression, expansion, and exhaust stroke in a repeating pattern. Each repeating pattern may be referred to as a working cycle of the cylinder.

Internal combustion engines typically have a plurality of cylinders or other working chambers in which an air-fuel mixture is combusted. The working cycles associated with the various engine cylinders are temporally interleaved, so that the expansion stroke associated with the various cylinders is approximately equally spaced, delivering the smoothest engine operation. Combustion occurring in the expansion stroke generates the desired torque as well as various exhaust gases. The expansion stroke is often denoted as the combustion or power stroke, since this is the power producing stroke.

Under normal driving conditions, the torque generated by an internal combustion engine needs to vary over a wide range in order to meet the operational demands of the driver. Over the years, a number of methods of controlling internal combustion engine torque have been proposed and utilized. Some such approaches contemplate varying the effective displacement of the engine. Two different engine control approaches that vary the effective displacement of an engine include: (1) the use of multiple fixed displacements; and (2) skip fire engine operation. In fixed multiple displacement control some fixed set of cylinders is deactivated under low load conditions; for example, an 8-cylinder engine that can operate on the same 4 cylinders under certain conditions. In contrast, skip fire control operates by sometimes skipping and sometimes firing a cylinder. In some engines all cylinders are capable of firing or skipping, while in other engines only a subset of the engine's cylinders have skip fire capability. In general, skip fire engine control is understood to offer a number of potential advantages, including the potential of significantly improved fuel economy in many applications. Although the concept of skip fire engine control has been around for many years, and its benefits are understood, skip fire engine control has only recently obtained some commercial success.

It is well understood that operating engines tend to be the source of significant noise and vibrations, which are often collectively referred to in the field as NVH (noise, vibration and harshness). In general, a stereotype associated with skip fire engine control is that skip fire operation of an engine will make the engine run significantly rougher, that is with increased NVH, relative to a conventionally operated engine. In many applications, such as automotive applications, one of the most significant challenges presented by skip fire engine control is vibration control. Indeed, the inability to satisfactorily address NVH concerns is believed to be one of the primary obstacles that has prevented widespread adoption of skip fire types of engine control.

U.S. Pat. Nos. 7,954,474, 7,886,715, 7,849,835, 7,577,511, 8,099,224, 8,131,445, 8,131,447, 8,616,181, 8,701,628, 9,086,020 9,328,672, 9,387,849, 9,399,964, 9,512,794, 9,745,905, and others, describe a variety of engine controllers that make it practical to operate a wide variety of internal combustion engines in a skip fire operational mode. Each of these patents and patent applications is incorporated herein by reference. Although the described controllers work well, there are continuing efforts to further improve the performance of these and other skip fire engine controllers to further mitigate NVH issues and improve fuel economy in engines operating under skip fire control. The present application describes additional skip fire control features and enhancements that can improve engine performance in a variety of applications.

SUMMARY

In various embodiments, a system and method to vary the type of gas spring in a skipped working chamber of a skip fire controlled engine is described. Various embodiments relate to changing the timing of cylinder intake and exhaust events to modify the nature of gases trapped in the working chamber during a skipped working cycle. The fuel injection timing and ignition timing may also be modified. The nature of the gas spring can be varied to improve NVH levels and fuel economy. Oil consumption and exhaust emissions may also be considered in determination of the gas spring type.

In one aspect, a method of controlling the nature of the gases trapped in a working chamber during a skipped working cycle is described. Depending on the intake and exhaust valve opening and closing sequence, the gases trapped have different masses and constituent components, effectively forming gas springs during the skipped working cycle(s). A skipped working cycle may have a low pressure exhaust spring (LPES), a high pressure exhaust spring (HPES), or an air spring (AS). The type of gas spring may be chosen to optimize fuel efficiency and provide an acceptable level of NVH.

In another aspect, an engine controller determines a fire/skip sequence appropriate for delivering a requested engine output. The fire/skip sequence includes information on the type of gas spring present in skipped working cycles and the timing available to deactivate valves.

In another aspect, a method of operating an engine in response to a no torque request is described. All working chambers of the engine are skipped in response to the no torque request. During the duration of the deactivation, each working chamber operates with an air spring or high pressure exhaust spring type gas spring for a least one working cycle of the skipped working cycles.

The various aspects and features described above may be implemented separately or in any combination.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to improving operation of a skip fire controlled internal combustion engine that provides motive torque for powering a vehicle. The present invention discloses that by changing the timing of induction and exhaust events the gases trapped in a working chamber or cylinder during a skipped firing opportunity may differ. The trapped gases form different types of "gas springs" and the type of gas spring used may vary depending on the cylinder load, engine speed, and skip fire pattern. "Gas spring type" here refers to the amount and type of gas trapped in a deactivated cylinder. Several types of cylinder deactivation strategies can be used in skip fire operation. The deactivation strategies can generally be categorized into three types: low pressure exhaust spring (LPES), high pressure exhaust spring (HPES), and air spring (AS). Each category varies the order and timing of deactivation/reactivation of intake valves, exhaust valves, fuel injection, and spark timing. Within each of these gas spring types there are various sub-categories described below that vary based on which valve starts or ends the skipping sequence.

Figure 1:
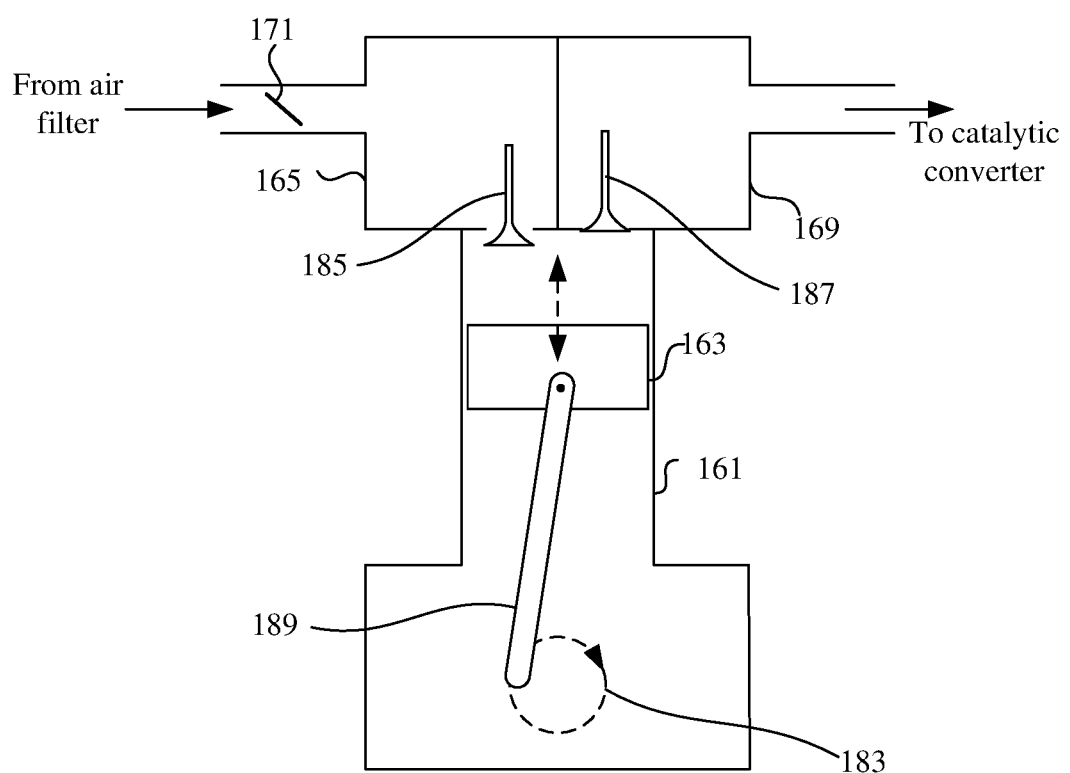
FIG. 1 is a schematic example diagram showing a portion of an engine system.

FIG. 1 illustrates an example internal combustion engine that includes a cylinder 161, a piston 163, an intake manifold 165, and an exhaust manifold 169. Air is inducted into cylinder 161 through an intake valve 185. Combustion gases are vented from cylinder 161 through an exhaust valve 187. A throttle valve 171 controls the inflow of air from an air filter or other air source into the intake manifold 165. Expanding gases from combustion increase the pressure in the cylinder and drive the piston down. Reciprocal linear motion of the piston is converted into rotational motion by a connecting rod 189, which is connected to a crankshaft 183. A 4-stroke engine takes two crankshaft revolutions, 720 degrees, to complete a working cycle.

The present invention relates generally to methods and devices for controlling the operation of intake and exhaust valves of an internal combustion engine during skip fire operation. In various embodiments, the valves are controlled using an eccentric cam to open and close the valves. A collapsible valve lifter may be incorporated in the valve train to allow deactivation of the valves during a skipped working cycle. That is the valve will remain closed as long as the collapsible lifter associated with the valve is in its collapsed state and will open and close with cam rotation when the lifter is in its rigid state. Collapsible lifters are one form of a general class of lost motion systems where cam rotation does not result in valve motion. Valve deactivation may alternatively be controlled by a sliding cam, collapsible lash adjuster, or collapsible roller finger follower, among other methods. Valve timing may be controlled with a cam phaser that adjusts the opening/closing time of the valve relative to the crank angle. In some embodiments, no cam is required to move the valves. The valve motion may be accomplished by electro-magnetic, hydraulic, or pneumatic means. Any of these valve motion systems may be used with the present invention.

In one embodiment the combustion and gas exchange processes of an internal combustion engine operating in skip fire mode may be changed so that the net or total torque generation characteristics are modified. In particular, the gas spring type of deactivated cylinders may be modified to adjust the temporal torque profile. Proper timing of the gas spring induced torque with respect to the cylinder firing events may result in an overall engine torque waveform with desirable characteristics. For example, there may be less content at frequencies most likely to be perceived as vibration or noise by vehicle occupants. The cylinder may also operate at a higher efficiency depending on the type of gas spring and cylinder load.

Figure 2:
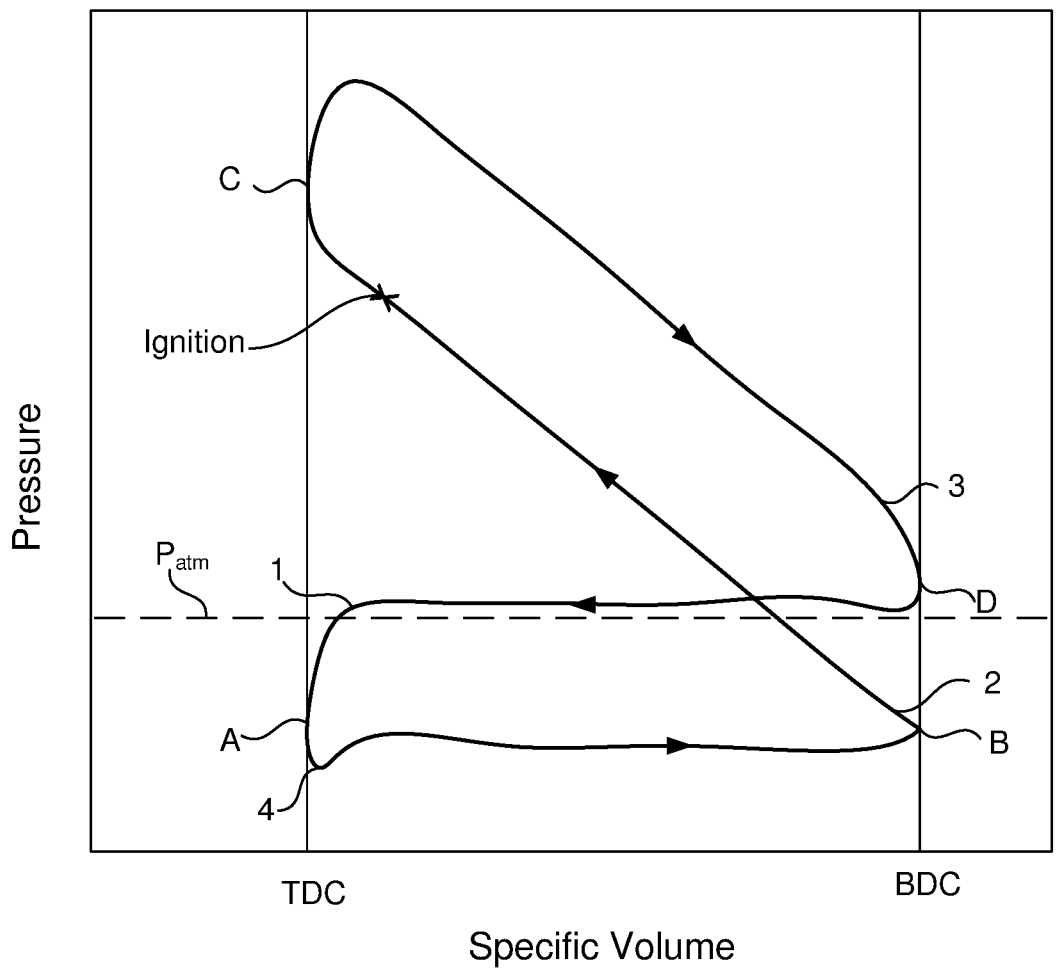
FIG. 2 is a representative graph of the pressure vs. volume relationship in a cylinder over a working cycle.

FIG. 2 depicts the pressure vs. volume (PV) relationship for a naturally aspirated, 4-stroke, Otto cycle engine over a firing working cycle. It is noted that the vertical (pressure) and horizontal (specific volume) axes are represented on a log scale in this figure and in the PV diagrams of FIGS. 3-5. Normal engine operation involves a repeating cycle of intake, compression, expansion, and exhaust that occurs over four strokes of piston movement, or two rotations of the crankshaft. Each stroke of piston movement from top dead center (TDC) to bottom dead center (BDC), or vice versa, corresponds to one stroke or 180 degrees of crankshaft rotation. An air intake or induction stroke occurs during the first stroke of piston movement from TDC to BDC, from point A to point B in FIG. 2. A compression stroke occurs during the second stroke of piston movement from BDC to TDC, from point B to point C in FIG. 2. Combustion may be initiated by a spark ignition and occurs around TDC near the end of the second stroke and beginning of the third stroke. An expansion stroke occurs during the third stroke from TDC to BDC, from point C to point D in FIG. 2. An exhaust stroke occurs during the fourth stroke from BDC to TDC, from point D returning to point A in FIG. 2. The PV curve forms two loops. In general, the area bounded by the upper loop represents the amount of work that is generated by combustion in a firing cylinder, whereas the area bounded by the lower loop represents the energy losses that are experienced due to pumping air into and out of the cylinder (these losses are frequently referred to as pumping losses). Also shown in FIG. 2 is the atmospheric pressure, denoted as $P_{atm}$. For most of the intake stroke the cylinder pressure is below atmospheric pressure, since the cylinder is inducting air from an intake manifold whose pressure is held below atmospheric pressure by control of a throttle valve.

For improved fuel efficiency, it is desirable to make the pumping losses as small as possible. This is achieved by opening the throttle, which shifts the portion of the PV curve between points A and B closer to atmospheric pressure. Reducing pumping loss is a primary reason skip fire operation offers improved fuel efficiency, since the engine output is controlled primarily by firing density, not by throttling air flow into the engine.

FIG. 2 also depicts representative opening and closing times for the intake and exhaust valve(s) of the cylinder. Point 1 corresponds to the opening time of the intake valve. Point 2 corresponds to the closing time of the intake valve. Point 3 corresponds to the opening time of the exhaust valve. Point 4 corresponds to the closing time of the exhaust valve. As shown the intake valve opens a bit before TDC and the exhaust valve closes a bit after TDC resulting is some intake/exhaust valve overlap, which is typical in a modern engine. Point 2, where the intake valve closes, typically occurs a little after BDC to take advantage of gas momentum into the cylinder to squeeze more air into the cylinder and increase volumetric efficiency. Point 3, where the exhaust valve opens, typically occurs a bit before BDC. It should be appreciated that variable cam timing and valve lift strategies may shift intake/exhaust valve opening/closing either before or after TDC or BDC. Fuel injection can be either directly into the cylinder (direct injection, DI) or indirectly into the cylinder by injecting fuel into the incoming air charge outside the cylinder (port fuel injection, PFI) and will occur before the intake stroke (Point A) for PFI methods and during the intake and compression strokes (Point A to past Point B) for DI methods. Spark ignition, which triggers combustion, occurs around the end of the compression stroke as noted in FIG. 2. Other control strategies are possible, such as recompression where air inducted at the beginning of one working cycle is retained in the cylinder thru that cycle and combusted or vented in some subsequent cycle.

When a cylinder is skipped or deactivated, rather than fired, over a working cycle the PV curve is different than that depicted in FIG. 2. In particular for engines capable of intake and/or exhaust valve deactivation different amounts and types of gas can be trapped in a cylinder during a skipped working cycle forming different types of gas springs.

Figure 3:
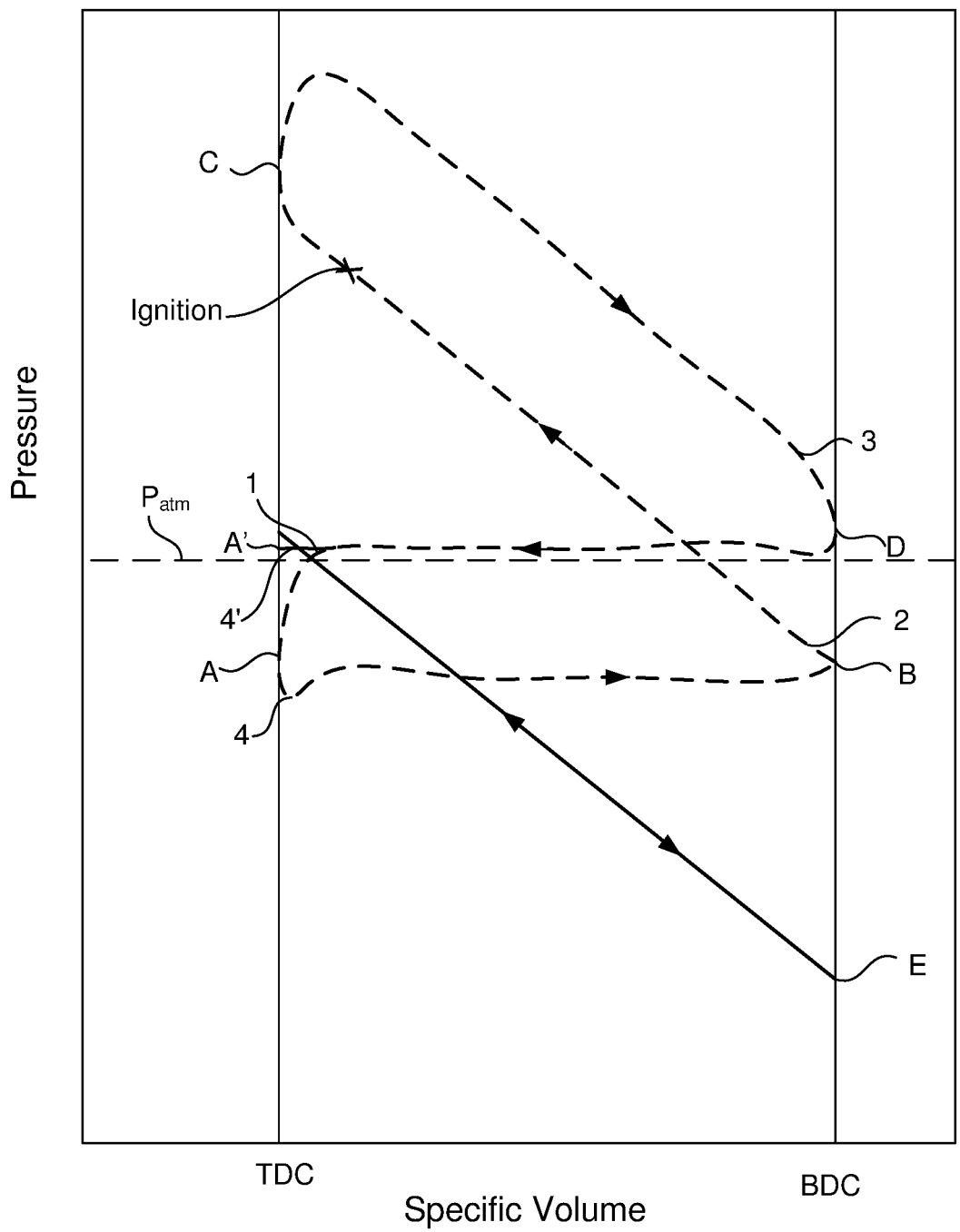
FIG. 3 is a representative graph of the pressure vs. volume relationship in a cylinder for a LPES type gas spring.

One type of gas spring is a low pressure exhaust spring (LPES), whose PV characteristics are depicted in FIG. 3. An LPES gas spring is realized by deactivating the intake valve immediately on an induction stroke that follows an exhaust stroke after a combustion stroke. In this case the intake valve remains closed whereas it would normally open for another induction event resulting in the cylinder never being open to intake manifold vacuum. Rather than the PV curve dropping below atmospheric pressure, the PV curve stays at or slightly above atmospheric pressure at point A'. Since the enclosed cylinder volume is small at the end of the exhaust stroke when the cylinder is sealed (Point 4'), use of a LPES leads to very low in-cylinder pressures at the end of the intake stroke when the enclosed cylinder volume is maximized (Point E). The cylinder contains mostly residual exhaust gas from the previous cycle. The trapped residual exhaust gases then experience a compression stroke moving back along the PV curve to at or near point A'. No fuel is injected during the compression stroke. Spark may or may not occur near TDC; however, there would be no combustion because there is no combustible air or fuel in the cylinder. No energy release would occur due to the absence of fuel and fresh charge, and the piston would start an expansion stroke moving from at or near point A' back to point E. At BDC, the exhaust valve would be deactivated and the piston would recompress the mixture during the exhaust stroke moving from point E back to at or near point A'. All valves would remain deactivated and fuel injection would not occur for as long as desired.

Practically, the LPES peak pressure would slowly increase until thermodynamic equilibrium was achieved. Depending upon crankcase pressure and combustion chamber pressure, vapors from the crankcase may flow from the crankcase around the piston rings and into the cylinder, increasing the mass and pressure of gas enclosed in the cylinder volume. When the decision to reactivate that cylinder is made, one option is to reactivate the intake valve first, causing the mixture of exhaust residual gas and crankcase vapor in the cylinder to be augmented with fresh air charge. Fuel injection and spark, if necessary, are reactivated, and combustion resumed. Finally, the exhaust valve is reactivated and the cylinder is back in normal firing mode.

A variant on the LPES control cylinder venting method is LPES with re-exhaust. In this case, the exhaust valve is reactivated before the intake valve. This results in two exhaust strokes without an intervening induction stroke. In this reactivation strategy the exhaust valve is reactivated first, followed by the intake valve and then fuel and spark. There are several reasons for doing this. First by having a re-exhaust event, gases that have leaked into the cylinder may be expelled prior to induction, making the inducted charge more similar to that of a cylinder operating without deactivation. A normally firing engine relies on valve overlap and gas flow momentum to scavenge as much exhaust residual from the cylinder as possible. This is missing from LPES without re-exhaust and will lead to lower volumetric efficiency on the first reactivated cycle. Second, in the event that combustion has occurred, perhaps mistakenly, during a skipped cycle, the re-exhaust would prevent the intake valve from opening on a HPES and causing potential valve train damage. Re-exhaust could be incorporated into a safety feature that requires the exhaust valve of any cylinder to open before the intake valve is allowed to open. If the exhaust valve fails to open or are deactivated, the intake valve would automatically be deactivated. A downside of this method is that its pumping loop is larger, and thus energy efficiency is lower, than that of normal LPES if the number of skipped cycles is short. As the number of skipped cycles increases the performance of the two methods becomes essentially equivalent, since most strokes experience identical conditions.

Figure 4:
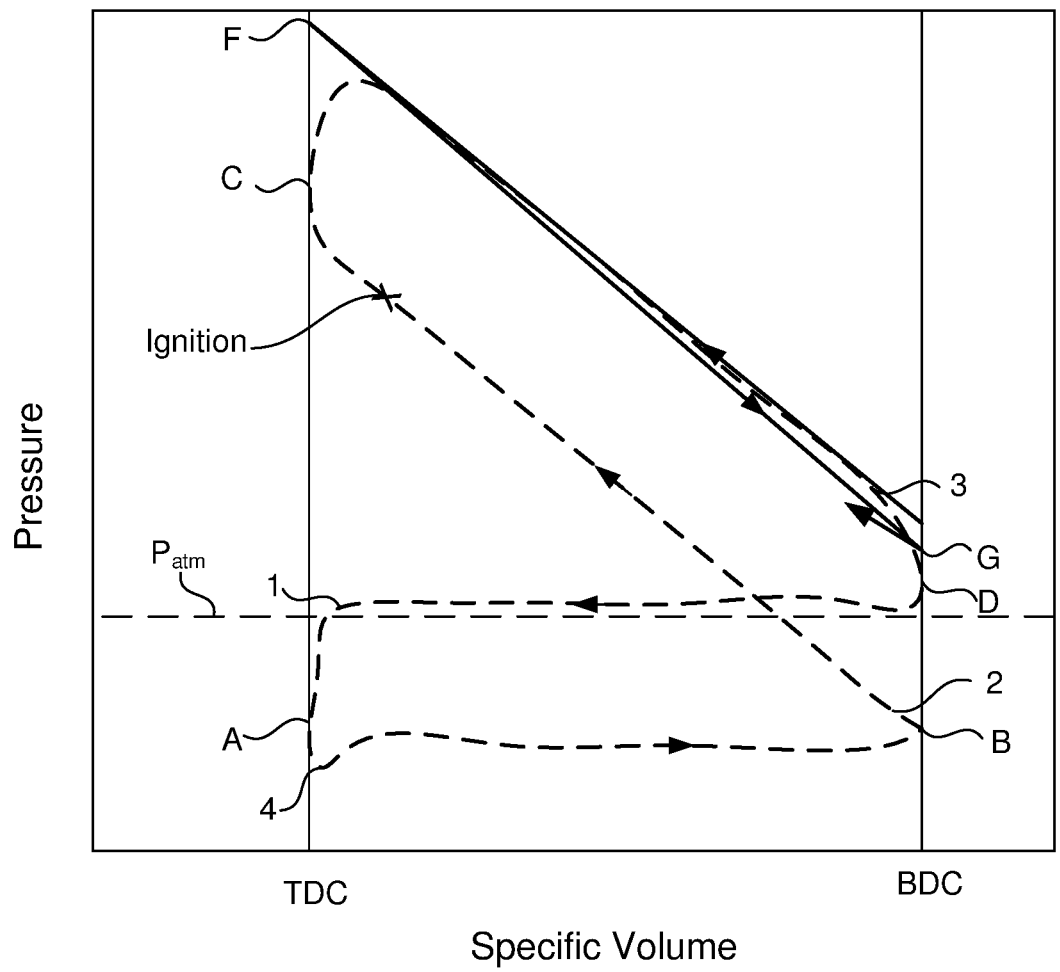
FIG. 4 is a representative graph of the pressure vs. volume relationship in a cylinder for a HPES type gas spring.

A second type of gas spring is a HPES, high pressure exhaust spring, whose PV characteristics are depicted in FIG. 4. When deactivating a cylinder via the HPES method, the induction, compression, and expansion strokes occur normally, and the exhaust stroke is skipped by deactivating the exhaust valve prior to point D, preventing the exhaust valve opening 3 and trapping high pressure exhaust gas in the cylinder. The high pressure exhaust gas would then be recompressed by the cylinder moving from point D to point F during the exhaust stroke, compressing the in-cylinder gases back to peak pressures somewhat higher than those encountered in the previous expansion stroke. The intake valve would be deactivated during the subsequent intake stroke, preventing possible valve train damage that could occur from opening a valve on such high pressure. The piston would then expand the high pressure gas a second time while it moves from point F to point G during what would be the intake stroke. Fuel injection would be disabled at this point so the compression and expansion strokes would just compress and expand the trapped high pressure exhaust gases. The compression and expansion of the high pressure gas would continue for as long as the cylinder is skipped, ideally between the same two pressures at TDC and BDC. In reality, heat and mass transfer from the cylinder would cause the cylinder pressure to drop rapidly, so each successive pressure/volume trajectory would be somewhat lower. When the decision is made to reactivate the cylinder, the exhaust valve may be reactivated first, followed by the intake valve, and finally fuel injection. This would allow the high pressure gas to be exhausted normally, permit a fresh charge to enter the cylinder, and normal combustion on the next firing.

A variation of the HPES control method is HPES with re-fueling. A main difference is that once the decision is made to reactivate a skipping cylinder, first the fuel is reactivated, then exhaust and intake. This requires DI and assumes enough combustible charge has either leaked into the cylinder from the crankcase or remains in the residual that has yet to be exhausted since the last combustion event. This variant is particularly applicable to a lean burn engine, where significant levels of excess oxygen may remain in the trapped residuals.

Another variation of the HPES control method is HPES with re-intake. In this strategy, when a skipping cylinder is reactivated, the intake valve is reactivated first, followed by fuel and exhaust. This is similar to the reactivation process of LPES without re-exhaust. As mentioned above, this strategy has the potential to cause serious valve train damage due to opening the intake valve on a cylinder pressure at a level near combustion peak pressure. This can be prevented with appropriate design of the intake valve and its associated valve train. By opening the intake valve on a HPES, the high pressure exhaust residual in the cylinder will blow down into the intake manifold, causing significant heating of the incoming charge. Volumetric efficiency may be low on the first reactivated cycle. The intake valves, ports, and manifold would need to be designed to handle higher than usual levels of pressure and temperature. This method has very large expansion/compression losses during deactivation resulting in large negative spring mean effective pressure, and consequently low fuel efficiency if the number of skipped cycles is short. This mode of operation may be especially useful in engines where some working cycles use homogenous charge compression ignition (HCCI) or similar types of combustion strategies.

Figure 5:
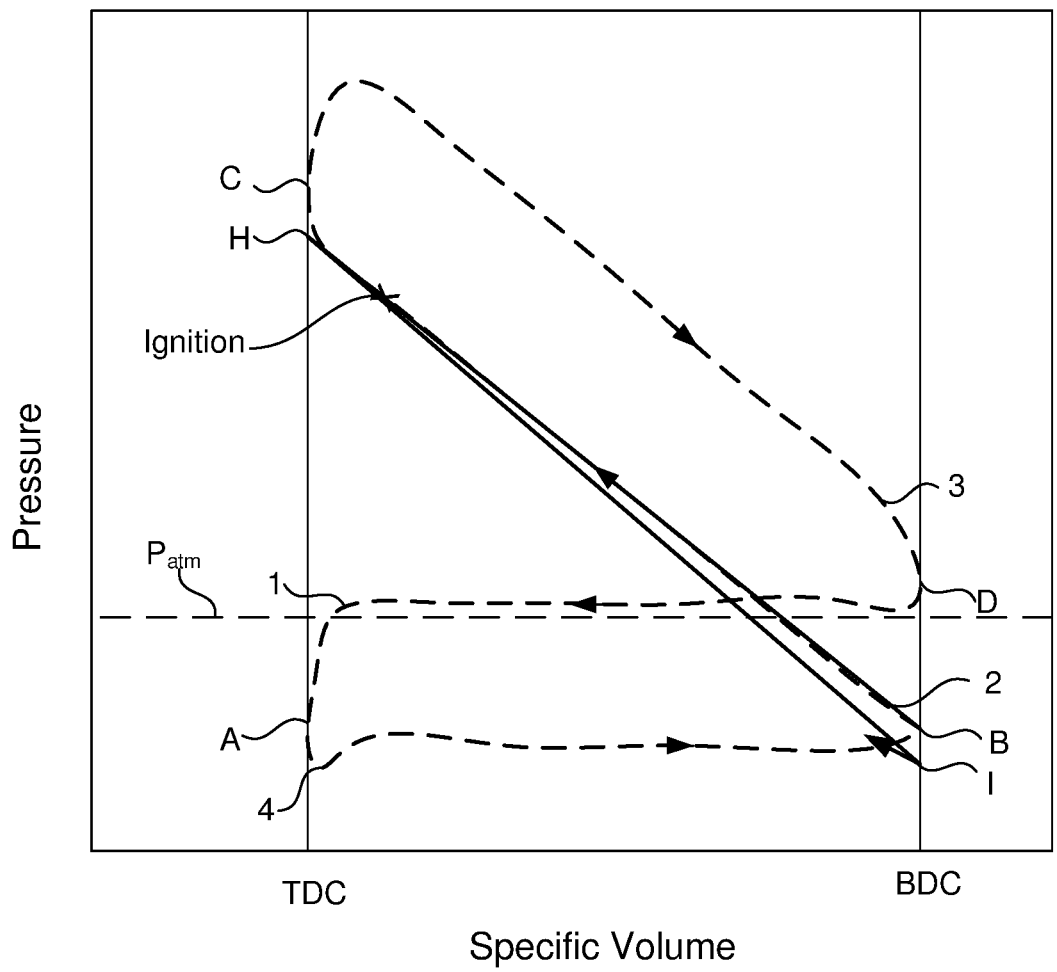
FIG. 5 is a representative graph of the pressure vs. volume relationship in a cylinder for an AS type gas spring.

A third type of gas spring is an AS, air spring, whose PV characteristics are depicted in FIG. 5. In the AS method of cylinder deactivation, the first stroke to be altered when deciding to deactivate is the expansion stroke. In a DI engine, intake would occur normally, but fuel would not be injected. The piston would compress the charge of mostly air with no combustion, traveling from point B to point H. From point H the air would expand to point I. At point I the exhaust valve would be deactivated and the piston would compress the air a second time. At TDC the intake valve would be deactivated, and the piston would expand the air a second time. This compression and expansion of mostly air would continue for as long as the cylinder is desired to be skipped. Ideally, the cylinder would act like an air spring. Practically, heat and mass transfer from the cylinder to the surroundings cause the cylinder mass and pressure to decrease over time, so each successive pressure/volume trajectory would be somewhat lower until the average pressure over a stroke is approximately atmospheric pressure. When the decision to fire the cylinder is made, fuel injection and spark, are restored first on a DI engine. This would likely produce a lower torque combustion event due to a lower air charge stemming from gas leakage as well as lower charge motion which normally aids fuel evaporation and mixing. The operation of the exhaust and intake valves would be restored next, respectively, and the cylinder would resume normal operation.

A variant of an air spring is a fuel/air spring. In an PFI engine, intake and fuel injection would occur normally, but spark would be deactivated when the decision to skip is made. The AS would be more like a fuel/air spring in this scenario, since the inducted gas is an air/fuel mixture in a PFI engine. In the absence of auto-ignition, the mass and pressure of the fuel/air mixture in the cylinder would again decrease over time as mass and heat loss to the crankcase and cylinder walls, respectively, would still occur. Exhaust and intake valves are deactivated in the same manner as for the DI engine. When the decision to fire again is made, the spark would be restored. Again, a weak combustion event would likely occur and the exhaust and then intake valves would be reactivated.

In another variant of AS, AS with re-intake, both DI and PFI engines would disable fuel injection first when the decision to skip is made. Intake would still occur normally, but no combustion would occur in the absence of fuel and perhaps spark. Exhaust would be deactivated, and finally, intake also would be deactivated and the engine would run in AS mode until the decision to reactivate is made. Once that happens, the first step is to reactivate the intake valve with fuel injection. This would refill the cylinder with fresh charge. Spark would be enabled, if necessary, and normal combustion would occur. Finally, the exhaust valve would be reactivated. This strategy has the benefit of avoiding the lower combustion air charge associated with normal AS. The downside is that the pumping loop can be quite large if the number of skipped cycles is short.

An AS with re-exhaust method differs from the other AS methods in that when the decision is made to stop skipping and start firing again, the exhaust valve is reactivated first, followed by intake and fuel injection. Like AS with re-intake, this avoids the lower air charge and resulting weak combustion event that would occur on the first reactivated cycle. Unlike AS with re-intake, AS with re-exhaust can avoid the large pumping loop if the number of skipped cycles is short. However, this method pumps uncombusted air into the exhaust. If only one cycle is skipped, this method essentially never deactivates the valves and a significant amount of air is pumped thru the cylinder, which may impact exhaust emission control systems.

Figure 6:
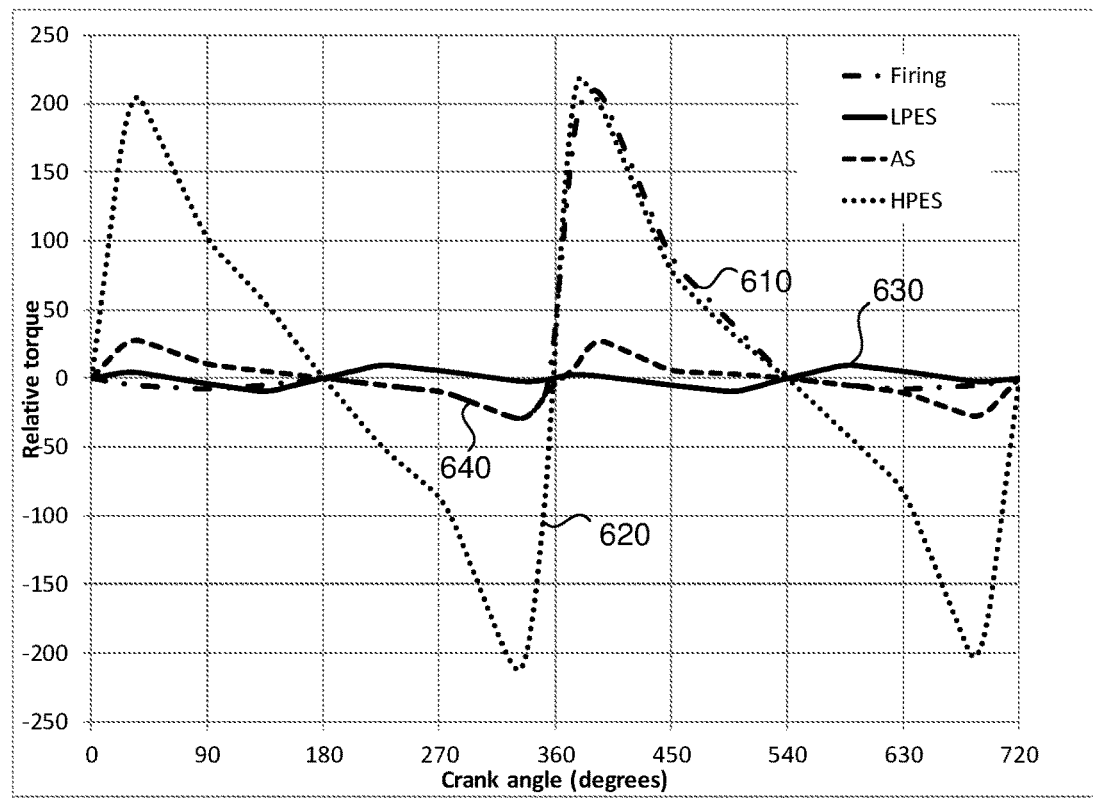
FIG. 6 is a representative graph showing torque signatures from AS, HPES, LPES type gas springs associated with a single cylinder.

The temporal torque profiles or signatures of the various types of gas springs are significantly different. FIG. 6 shows representative torque signatures from AS, HPES, and LPES type gas springs associated with a single cylinder. Also shown for comparison is the torque signature associated with a firing cylinder 610. The magnitude of the torque resulting from the high-pressure gas spring 620 is very high, comparable to or higher than the torque magnitude from a firing cylinder, both in a positive and negative direction. The low-pressure spring torque signature 630 has a very small magnitude, because of the very small amount of gas trapped in the cylinder. For much of a working cycle the trapped gas is at sub-atmospheric pressure as noted in the discussion of FIG. 3. The magnitude of the torque associated with an air spring 640 is intermediate between the HPES and LPES cases, although it is generally closer to the LPES case, since no hot combustion gases are trapped in the cylinder.

The air charge associated with an induction stroke following a skipped firing opportunity varies with the gas spring type that preceded the induction event. The amount of residual charge during a following cycle is a function of whether intake and exhaust valves are open simultaneously, and the relative timing of each, among other parameters. In addition, the relative temperature of the residual charge varies based on a number of factors, including the amount of time the residual charge is present in the combustion chamber and leakage into and out of the cylinder. Furthermore, pressure oscillations in the intake and exhaust manifold differ based on when and whether intake and exhaust valves open and close in both a given cylinder and other engine cylinders. From these and other effects, combustion parameters such as injected fuel mass and spark timing may be adjusted to compensate to match the inducted air charge. Injected fuel mass may be controlled to provide a stoichiometric or near stoichiometric air/fuel ratio, which is necessary for efficient operation of some pollution control devices, such as a 3-way catalyst. Spark timing may be adjusted to produce the maximum brake torque possible from the air/fuel charge, optimizing fuel economy.

Combining torque signatures of each cylinder, properly phased according to the cylinder firing order, results in a summed torque signature. Depending on the number of cylinders in the engine each firing opportunity will be separated by a nominal amount of crank rotation. For example, for a 6-cylinder engine successive firing opportunities in an engine with equal spacing between firing events will occur nominally every 120°. For an 8-cylinder engine with equal spacing between firing events, successive firing opportunities will occur nominally every 90°. For a 4-cylinder engine with equal spacing between firing events, successive firing opportunities will occur nominally every 180°. These crank angles are nominal values only, as the timing of the spark firing may be adjusted individually or in combination to change the profile of the resultant torque signature and optimize fuel economy.

Figure 7:
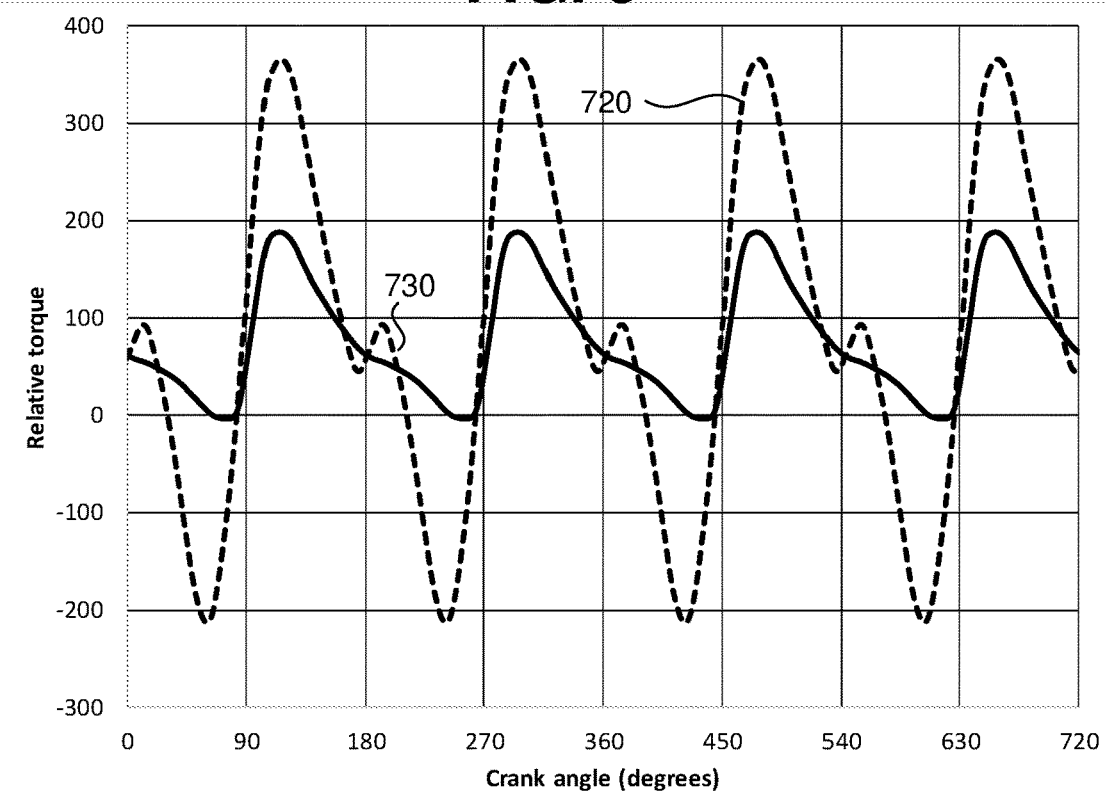
FIG. 7 is a representative graph of the total engine torque signature for a skip fire controlled, eight-cylinder engine operating at a firing fraction of ½ with a LPES and HPES type gas spring.

FIG. 7 shows a representative resultant torque signature for an 8 cylinder, 4-stroke engine operating with an alternating skip-fire-skip-fire . . . pattern. One trace 720 shows a HPES torque signature for the deactivated cylinders, and the other trace 730 shows a LPES torque signature for the deactivated cylinders. As can be seen the torque signatures are significantly different, with the LPES mode having significantly less deviation about a mean engine torque. Since NVH is generally correlated with the smoothness of engine torque delivery, FIG. 7 suggests that for this firing pattern operating in an LPES mode is preferable to HPES operation; other considerations, such as fuel economy, being equal. Generally, the gas spring type, along with the operational firing fraction or firing sequence, may be chosen to smooth variations in the temporal torque profile below an acceptable level. Also, the gas spring type may be chosen to reduce spectral content in the torque signature in a designated frequency range. This designated frequency range may correspond to a range of particular occupant sensitivity; for example, 0.5 to 12 Hz. It may also be chosen to avoid exciting any resonances in the vehicle or vehicle components.

Figure 8:
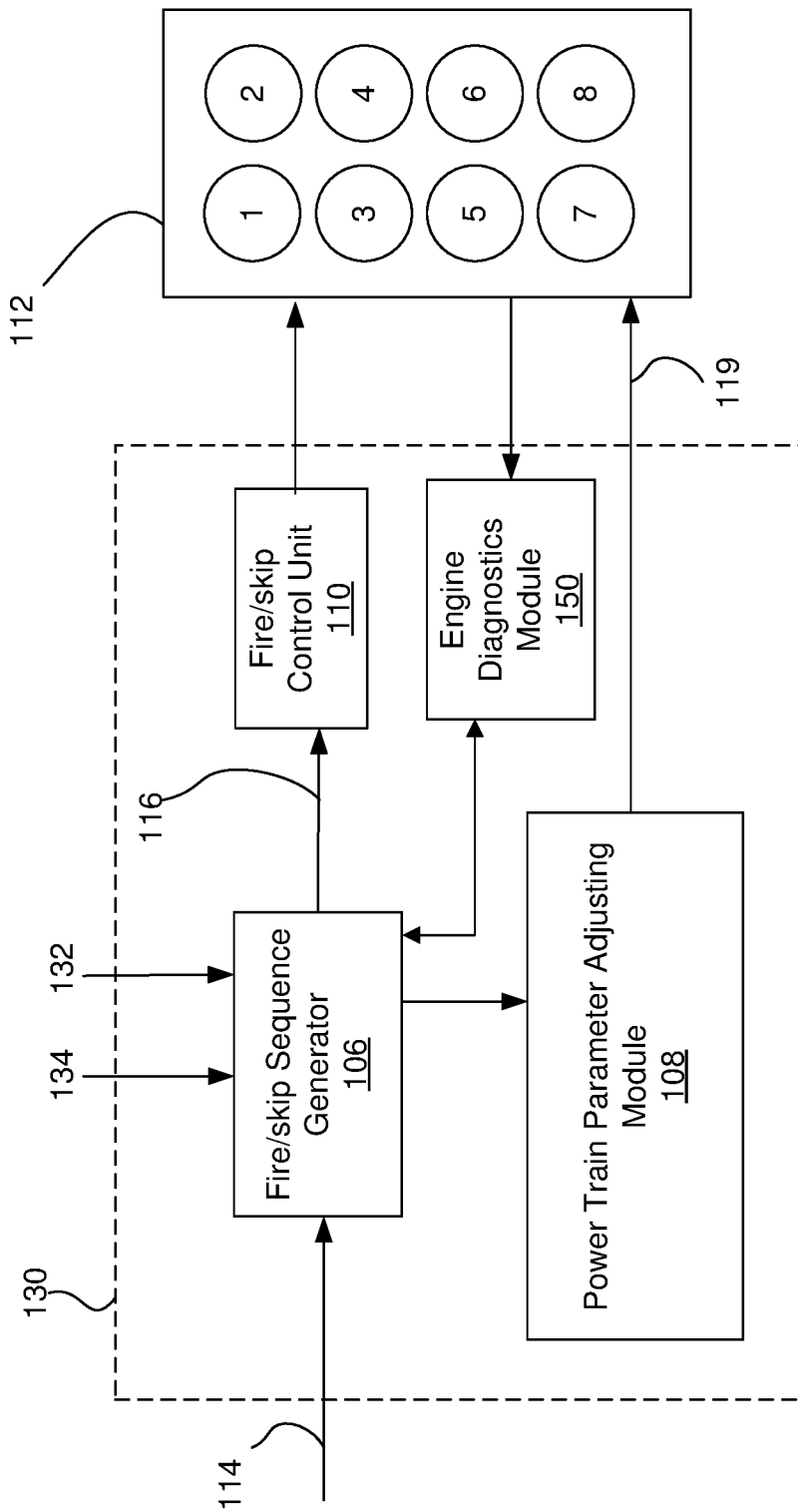
FIG. 8 is a schematic example diagram showing an exemplary engine control system.

Referring next to FIG. 8, a skip fire engine controller 130 will be described according to an embodiment of the present invention. The engine controller 130 includes a fire/skip sequence generator 106, a fire/skip control unit 110, a power train parameter adjusting module 108, and an engine diagnostics module 150. The engine controller 130 is arranged to operate the engine in a skip fire manner. The engine diagnostics module 150 is arranged to detect any engine problems (e.g., knocking, misfire, etc.) in the engine. Any known techniques, sensors or detection processes may be used to detect the problems. In various embodiments, if a problem is detected, the engine diagnostics module 150 directs the fire/skip sequence generator 106 to perform operations to reduce the likelihood of the problem arising in the future. Such actions may include adjusting the gas spring category on one or more cylinders and/or changing the power train parameters.

The engine controller 130 receives an input signal 114 representative of the desired engine output and various vehicle operating parameters, such as an engine speed 132 and transmission gear 134. The input signal 114 may be treated as a request for a desired engine output or torque. The signal 114 may be received or derived from an accelerator pedal position sensor (APP) or other suitable sources, such as a cruise controller, a torque calculator, etc. An optional preprocessor may modify the accelerator pedal signal prior to delivery to the engine controller 130. However, it should be appreciated that in other implementations, the accelerator pedal position sensor may communicate directly with the engine controller 130.

The fire/skip sequence generator 106 receives input signal 114, engine speed 132, transmission gear signal 134 and possibly other inputs and is arranged to determine a fire/skip sequence and gas spring type on skipped firing opportunities that would be appropriate to deliver the desired output. In various embodiments, the fire/skip sequence is any data that indicates whether a firing opportunity will be a fire or a skip and the type of gas spring associated with the skip. In engines with multi-level dynamic skip fire control as described in U.S. Pat. No. 9,399,964, which is incorporated in its entirety for all purposes, information regarding whether a fire is a low or high output firing may also be determined by the fire/skip sequence generator.

Information concerning the fire/skip sequence (or more generally the air charge sequence if a fire can have a low or high output) is inputted to fire/skip control unit 110 over signal line 116. The fire/skip control unit 110 orchestrates the opening and closing of the intake and/or exhaust valves to implement the fire/skip sequence and gas spring type associated with any skipped firing opportunity. For cam operated valves with lost motion collapsible type lifters, the fire/skip control unit operates solenoid control valves located in engine 112. These solenoid valves control the oil pressure in the collapsible lifter to determine whether the lifter is in its rigid or collapsible state. In FIG. 8 the engine 112 is depicted has having eight cylinders, but the engine can have any number of cylinders, such as 2, 3, 4, 5, 6, 8, 10, or 12.

In addition to the fire/skip control unit 110, engine 112 also receives control signals 119 from power train parameter adjusting module 108. Control signals 119 can include, but are not limited to, spark timing, injected fuel mass, throttle blade position, cam phaser position(s), cam valve lift, torque converter slip, exhaust gas recirculation valve settings, etc. The power train parameter adjusting module provides appropriate adjustment of these various power train parameters to ensure stable combustion for firing cylinders. The combustion conditions, such as spark timing, may be optimized to provide for maximum fuel efficiency.

Figure 9:
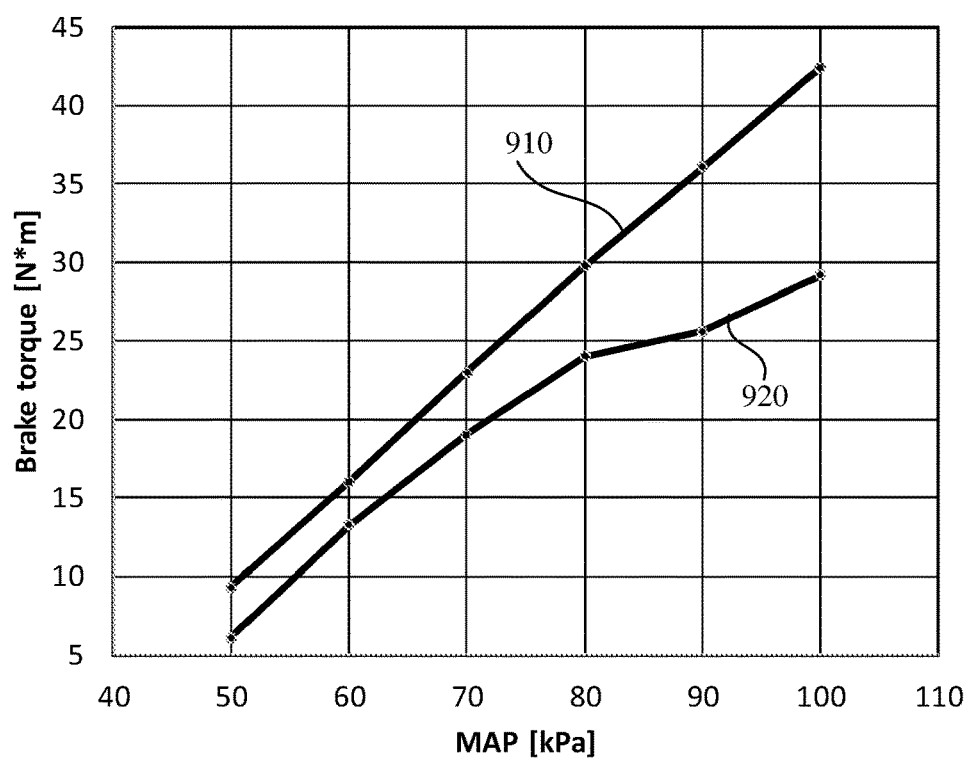
FIG. 9 is a plot of the brake torque versus intake manifold absolute pressure for a LPES and AS type gas spring for a representative engine.

In addition to impacting the NVH level, the gas spring type may also impact engine torque and engine fuel efficiency. FIG. 9 compares engine brake torque versus intake manifold absolute pressure (MAP) for an engine operating at 1600 rpm and an operational firing fraction of ⅓ for AS (without re-intake) and LPES (without re-exhaust) type gas springs. The engine is operating at a stoichiometric air/fuel ratio in both cases. The LPES torque output 910 is significantly higher than the AS torque output 920 at a given MAP level. This stems, at least in part, from a smaller air charge in the cylinder due to gas leakage from the cylinder while it is acting as an air spring and the lack of re-intake in the AS case, whereas the LPES case has an intake stroke immediately before re-firing.

Figure 10:
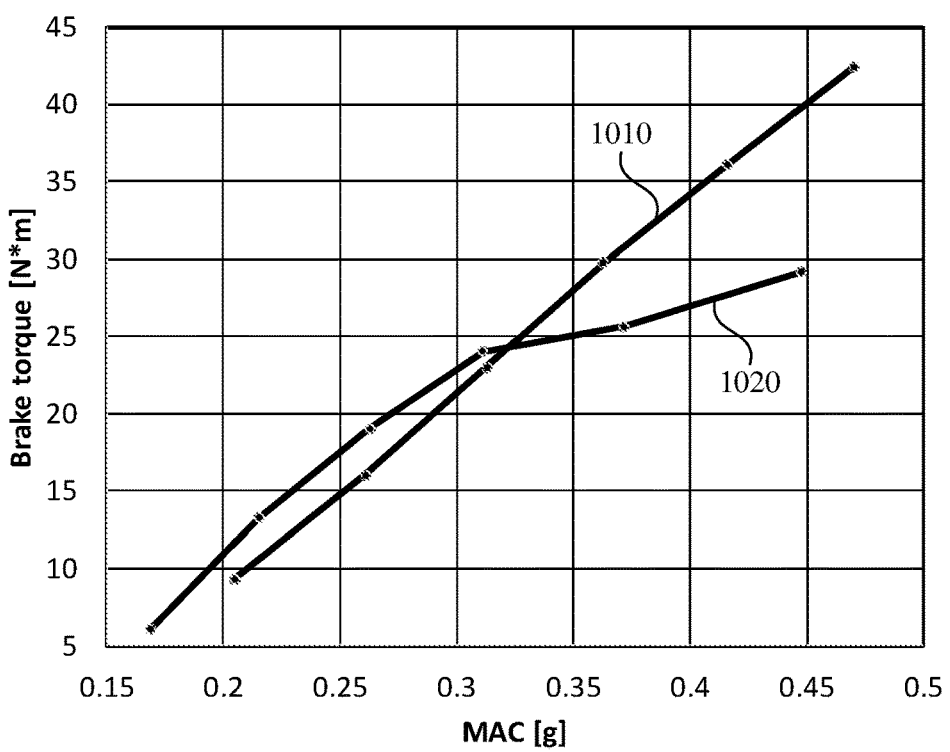
FIG. 10 is a plot of the brake torque versus mass air charge for a LPES and AS type gas spring for a representative engine.

While the engine output torque is generally lower with AS compared to LPES gas spring types with the aforementioned re-intake and re-exhaust strategy, the fuel efficiency behavior is more complex. FIG. 10 compares the engine brake torque versus mass air charge for AS and LPES gas spring types under the same engine operating conditions as FIG. 9. The LPES curve 1010 shows an almost linear dependence, while the AS curve 1020 crosses over at higher MAC values. Since the fuel consumption is proportional to MAC, FIG. 10 demonstrates that fuel efficiency under low loads is greater using an AS and under high loads using a LPES. One reason AS has better efficiency at low loads is that AS maintains traditional valve overlaps whereas LPES does not. As the MAC increases a higher proportion of the charge is either lost or diluted while operating with an AS type gas spring, reducing fuel economy. The cylinder load threshold for changing gas spring type to maximize fuel efficiency can vary engine speed and firing fraction or firing pattern.

Figure 11:
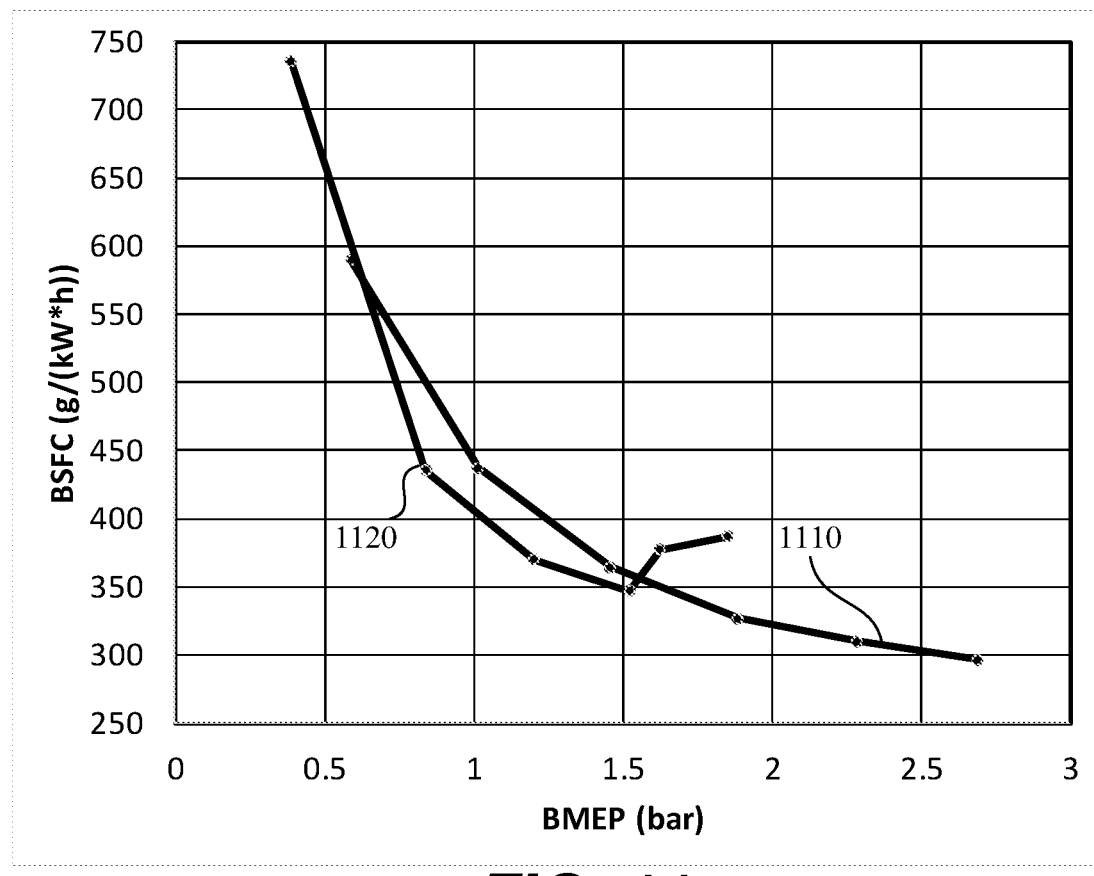
FIG. 11 is a plot of the brake specific fuel consumption versus brake mean effective pressure for a LPES and AS type gas spring for a representative engine.

The improvement in fuel efficiency by operating with an AS in certain low load regimes is clearly demonstrated in FIG. 11. FIG. 11 plots the brake specific fuel consumption (BSFC) versus the brake mean effective pressure (BMEP). Inspection of FIG. 11 shows that AS operation (curve 1120) results in better fuel efficiency than LPES operation (curve 1110) for loads below approximately 1.5 bar BMEP. The crossing of curves 1110 and 1120 near 0.6 BMEP is an artifact of the interpolation and should not be interpreted as LPES being more efficient than AS under these very low load conditions. Thus, under these loads, and the assumed engine speed, firing fraction, and re-intake/re-exhaust strategy it is preferable to operate with an AS and for other loads to operate with a LPES to improve fuel economy.

Aside from NVH and fuel efficiency, the gas spring choice may also impact oil consumption and emissions. When the cylinder pressure is below atmospheric pressure, there is a tendency for oil that lubricates the cylinder walls to be drawn into the cylinder. This oil will then be present for the next combustion event, where it may vaporize and experience incomplete combustion. The vaporized oil, and its combustion constituents, then flow into the exhaust manifold during the exhaust stroke. If left untreated, the oil and combustion constituents in the exhaust stream may result in undesirable emissions into the environment.

Because of possible oil ingress into the cylinders, it may be desirable to avoid prolonged use of a LPES type spring, since this spring type operates with the lowest in-cylinder pressures. One particular situation where cylinders may be deactivated for extended time periods is during decel cylinder cut-off (DCCO). This operational mode may be used during driving conditions when no engine torque is needed, such as coasting, going downhill, or stopping a vehicle. A DCCO event may extend for many seconds resulting in many successive skipped firing opportunities. During DCCO all the engine's cylinders are deactivated, so each firing opportunity is skipped and the cylinders are not fueled. As a result, no or little air is pumped thru the engine. DCCO operation improves fuel economy and reduces requirements to rebalance a catalytic converter that may be part of an emission control system. The advantages and use of DCCO operation is more fully described in U.S. Pat. No. 9,790,867, which is incorporated in its entirety for all purposes.

When no engine torque is requested, it may be desirable to avoid exclusive use of a LPES and instead use at least some AS or HPES type gas springs during the period of no torque request. For example, to reduce use of a LPES type spring in DCCO, an air spring or high pressure exhaust spring type spring may be used for a least one working cycle of the succession of skipped working cycles. In one embodiment, a DCCO event may begin using a LPES in each cylinder and then switch to using an AS after some time period or number of skipped working cycles. In another embodiment, a DCCO event may use a HPES initially on at least some cylinders and then shift to an AS at some point in the DCCO event. It should be appreciated that generally the length of a DCCO event is not known when the DCCO event is initiated, so some DCCO events, such as longer events, may use different types of gas springs, while other DCCO events, such as shorter DCCO events, may use only one type of gas spring.

Transitioning from one gas spring type to another gas spring type within a succession of skipped firing opportunities generally involves opening an intake or exhaust valve at the appropriate time during a working cycle. A HPES will always require a combustion event to generate high pressure exhaust gases. So long as the intake or exhaust valve remain closed after combustion a HPES will remain in the cylinder (ignoring mass and heat losses, which will, of course, occur). A transition from a HPES to an AS may be made after a desired number of HPES working cycles by opening first the exhaust valve for one stroke and then the intake valve for one stroke. A scavenging process will occur and an AS with a fresh charge will be present in the cylinder. To prevent combustion, fuel injection and/or spark will need to be deactivated. A transition from a HPES to a LPES after a desired number of HPES working cycles may be made by opening the exhaust valve for one stroke. Most of the exhaust residual will be purged from the cylinder, but no new charge will be inducted since the intake valve remains closed. The cylinder may operate with a LPES type gas spring for as long as desired. At least one combustion event is required to go back to an HPES from an AS or LPES type of gas spring.

Transitions between an AS and LPES type gas spring can be made as many times as desired, but there is some pumping work associated with these switches. To transition from a LPES to AS, the intake valve is reactivated for one stroke at or near TDC to induct a fresh air charge. Air spring operation may be maintained as long as desired by disabling fuel injection and/or spark. To transition from an AS to LPES, the exhaust valve is reactivated for one stroke at or near BDC of an expansion stroke. This vents cylinder gases, which are mostly air in an AS, into the exhaust system. The intake valve remains closed and the cylinder is now operating with a LPES for as long as desired.

In certain driving situations it may be desirable to use a HPES gas spring type on skipped cylinders. For example, if operation with a fixed set of activated and deactivated cylinders is anticipated for an extended time period, a HPES may be used on the skipped cylinders. A substantially constant torque demand for a long duration may be expected; for example, during cruising on a flat, open road at a firing fraction whose denominator is a factor of the number of engine cylinders; for example, ½ for 4, 6 or 8 cylinder engines, ⅓, ½, ⅔ for 6 cylinder engines, etc. Since the HPES is anticipated to occur over an extended number of working cycles, pumping losses associated with venting the HPES will be small. Use of a HPES type gas spring will reduce the possibility of oil ingress into the skipped cylinders and possible emission issues.

Advantageously, dynamic control of the gas spring type may be used in vehicles with autonomous driving controls as described in U.S. patent application Ser. Nos. 15/642,132 and 15/849,401, which are incorporated in their entirety for all purposes. Autonomous vehicle control generally offers greater advanced knowledge of future engine torque requests, so that the length of successive series of skipped working cycles may be known or estimated at the initiation of the series of skipped working cycles. This allows determination of an optimum gas spring type or gas spring switching strategy at the beginning of the skipped working cycle series. Also, in cases where there are no vehicle occupants, autonomous vehicle control relaxes NVH constraints allowing use of different gas spring strategies.

In practice the engine controller 130 shown in FIG. 8, or an engine controller with similar functionality, can dynamically select the type of gas spring used on any skipped cylinder. This determination can be made on a skipping opportunity by skipping opportunity basis so as to optimize fuel efficiency and maintain NVH below an acceptable level. Exhaust emissions and oil consumption may also be considered in determination of the spring type. The type of spring associated with any skip may be determined algorithmically or may be based on one or more lookup tables that indicate the spring type to be used under particular operating conditions. It should be appreciated that on any given engine cycle not all cylinders need have the same spring type. That is one skipped cylinder may be operating with an AS while another skipped cylinder may be operating with an LPES. Also, if a cylinder is skipped on successive firing opportunities the nature of the skip may be changed, for example, from a HPES to a LPES by venting the cylinder at some point during the skipping sequence.

This type of control is possible using cam operated valves with "lost motion" type deactivation. The valve control may be arranged so that a single solenoid activates/deactivates both the intake and exhaust valves or that the intake valve and exhaust valve have independent activation/deactivation solenoids. As described in more detail in co-pending U.S. patent application Ser. No. 14/812,370 there is a latency period between when a fire/skip decision is made and when it is implemented. This latency period can be in the range of 4 to 12 firing opportunities for cam actuated valves. This latency period allows the firing control unit 110 sufficient time to activate/deactivate the intake and/or exhaust valves as appropriate. The latency period also allows the power train parameter adjusting module sufficient time to adjust power train parameters such as throttle, spark timing, injected fuel mass, torque converter clutch slip, etc. to provide the requested engine output with optimum fuel efficiency and an acceptable NVH level.

Many control strategies can be used to determine an appropriate skip fire and gas spring pattern that delivers the requested engine output, while simultaneously minimizing fuel consumption and providing an acceptable level of NVH. For example, short-horizon optimal control, also known as model predictive control (MPC) or receding horizon control may be used. Herein short-horizon may refer to optimization of spring type over the queue of firing decisions that have been made, but not yet implemented. This may be in the range of 4 to 12 firing opportunities, but could be more or less. Since these decisions are known before they are implemented, the torque output, fuel consumption, and NVH levels associated with any fire/skip sequence and corresponding sequence of gas spring types can be calculated. The fire/skip sequence generator can compare the characteristics associated with any given sequence and select the best sequence based on optimization criteria. Furthermore, predictions of torque demand and corresponding firing decisions beyond this horizon can be included in the optimization problem to be solved.

Model-predictive control is a variant of optimal control in which a simplified mathematical optimization problem is solved repeatedly as the system is in operation, using the latest sensor information each time from the system to counteract the fact that the optimization problem is often highly simplified and as such only approximates the mathematical formulation for finding the "best" fire/skip sequence and/or skipping spring types. This combined optimization formulation allows generating the requested engine output, while maximizing fuel economy and maintaining an acceptable NVH level.

In general, optimization is a taxing computational operation that is not guaranteed to converge in a fixed number of iterations. In order to help this situation for real-time implementation, a short-horizon optimization algorithm that implements short-horizon optimization control can be highly simplified. Since the optimization is solved repeatedly as time progresses, errors in the solutions obtained to the simplified optimization problems relative to the original more complex optimization problem will, if the simplifications are chosen properly, use current measurements of engine parameters. The use of current parameters may be considered a type of feedback control to correct the solution in the direction of the original optimization criteria. An alternative method to reduce the computational overhead of real-time optimization is to precompute and tabulate portions of the optimization problem. The net result is to trade off computational burden for memory burden, which in certain electronic control units may be advantageous.

It should be also appreciated that any of the operations described herein may be stored in a suitable computer readable medium in the form of executable computer code. The operations are carried out when a processor executes the computer code. The computer code may be incorporated in an engine controller that coordinates the opening and closing of the intake and exhaust valves.

The invention has been described primarily in the context of gasoline powered, 4-stroke piston engines suitable for use in motor vehicles. However, it should be appreciated that the described methods and apparatus are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of diesel engines, Otto cycle engines, Dual cycle engines, Miller cycle engines, Atkinson cycle engines, Wankel engines and other types of rotary engines, mixed cycle engines (such as dual Otto and diesel engines), hybrid engines, radial engines, etc. It is also believed that the described approaches will work well with newly developed internal combustion engines regardless of whether they operate utilizing currently known, or later developed thermodynamic cycles.

Although only a few embodiments of the invention have been described in detail, it should be appreciated that the invention may be implemented in many other forms without departing from the spirit or scope of the invention. For example, the control strategies described herein could be implemented with a fully flexible valve train that is not dependent on a camshaft for valve event timing. Some of the strategies described herein can also be used in the absence of injection and ignition control, for instance, on a homogenous charge compression ignition (HCCI), or similar compression or spark-assisted combustion engines that utilizes premixed or non-pre-mixed air/fuel charges. The fire/skip sequence can also, in some cases, contain information on whether a fire results in either a high or low output level. Thus, the sequence may be one of high output fires, low output fires, and skips. While the invention has generally been describe as using an intake and exhaust valve to control induction and exhaust of a cylinder, a cylinder may have multiple intake and/or exhaust valves and the control strategies may collectively control their motion. Therefore, the present embodiments should be considered illustrative and not restrictive and the invention is not to be limited to the details given herein.

What is claimed is:

1. A method of controlling an internal combustion engine having a plurality of cylinders during skip fire operation of the engine, the method comprising:
   determining that a selected cylinder will be skipped on a first firing opportunity having an associated first working cycle;
   selecting a first gas spring type associated with the first skipped firing opportunity wherein the selection of the first gas spring type is based at least in part on a then current cylinder load;
   controlling valves associated with the selected cylinder to cause the selected cylinder to operate in accordance with the selected first gas spring type during the first working cycle;
   determining that the selected cylinder will be skipped on a second firing opportunity having an associated second working cycle, the second firing opportunity being different than the first firing opportunity; and
   selecting a second gas spring type associated with the second skipped firing opportunity, wherein the second gas spring type is different than the first gas spring type.

2. A method as recited in claim 1 wherein the selection of the gas spring type associated with each skipped working cycle is individually made on a skipping opportunity by skipping opportunity basis.

3. A method as recited in claim 1 wherein the first gas spring type is based is a low pressure exhaust spring and the second type of gas spring is an air spring.

4. A method as recited in claim 3 wherein the selection of the second gas spring type is based at least in part on at least one of:
   a time lapse that has occurred since the operating occurrence of the first skipped firing opportunity;
   a number of skipped working cycles in the selected cylinder that have occurred since the first skipped firing opportunity; or
   an engine speed.

5. A method as recited in claim 1 wherein the first and second selected gas spring types are each selected from the group consisting of a low pressure exhaust spring, a high pressure exhaust spring, and an air spring.

6. A method as recited in claim 1 wherein the selection of the gas spring type is based at least in part on optimizing fuel economy while simultaneously delivering the requested engine output and providing an acceptable NVH level.

7. A method as recited in claim 1 wherein cams are used to actuate the valves associated with the selected cylinder.

8. A method as recited in claim 4 wherein the valves include intake and/or exhaust valves and the intake and/or exhaust valves remain in a closed position if a lost motion valve lifter is in its collapsed state.

9. A method as recited in claim 1 wherein the determination of the gas spring type is based on a short-horizon optimization algorithm.

10. A method as recited in claim 9 wherein the short-horizon optimization algorithm includes in the optimization criteria fuel economy and NVH associated with the fire/skip sequence.

11. A method of controlling skip fire operation of an internal combustion engine having a plurality of cylinders, each cylinder being configured to operate in a sequence of working cycles with each working cycle having an associated firing opportunity, the method comprising:
   for each firing opportunity, determining whether to skip or fire the associated working cycle;
   for each skipped working cycle, individually selecting a gas spring type from a plurality of potential gas spring types to use in connection with such working cycle such that the gas spring type for each skipped working cycle is determined on a skipping opportunity by skipping opportunity basis, wherein different gas spring types are sometimes used for different skipping opportunities during skip fire operation of the internal combustion engine.

12. A method as recited in claim 11 wherein the potential gas spring types include at least two selected from the group consisting of a low pressure exhaust spring, a high pressure exhaust spring, and an air spring.

13. A method as recited in claim 11 wherein the selected gas spring type is based at least in part on a then current cylinder load.

14. A method as recited in claim 11 wherein the selected gas spring type is based at least in part on a current engine speed.

15. A method as recited in claim 11 wherein the selected gas spring type is based at least in part on a current operational firing fraction.

16. A method as recited in claim 11 wherein air springs are used when the selected cylinder is operating at a cylinder load lower than a designated threshold and low pressure exhaust springs are used when the selected cylinder is operated at a cylinder load higher than the designated threshold.

17. A method as recited in claim 16 wherein the designated threshold varies as a function of at least one of engine speed and operational firing fraction.

18. A method of controlling operation of an internal combustion engine having a plurality of cylinders, each cylinder being configured to operate in a sequence of working cycles with each working cycle having an associated firing opportunity, the method comprising:

directing a selected cylinder to not be fueled and fired during a multiplicity of skipped working cycles that sequentially follow a fired working cycle of the selected cylinder without any intervening firings of the selected cylinder;

operating the selected cylinder as a first type of gas spring for a first plurality of the multiplicity of skipped working cycles that sequentially follow the fired working cycle of the selected cylinder; and operating the selected cylinder as a second type of gas spring for at least one additional skipped working cycle of the multiplicity of working cycles following the first plurality of the multiplicity of working cycles, wherein the second type of gas spring is different than the first type of gas spring.

19. A method as recited in claim 18 wherein the first type of gas spring is a low pressure exhaust spring and the second type of gas spring is an air spring.

20. A method as recited in claim 18 wherein the first type of gas spring is a high pressure exhaust spring and the second type of gas spring is an air spring.

21. A method as recited in claim 18 wherein the first type of gas spring is a high pressure exhaust spring and the second type of gas spring is a low pressure exhaust spring.

22. A method as recited in claim 18 wherein the method is performed when the engine transitions to a deceleration cylinder cut-off (DCCO) operational mode.

23. A method of controlling an internal combustion engine having a plurality of cylinders, each cylinder having associated valves and being configured to operate in a sequence of working cycles, each working cycle having an associated firing opportunity, the method comprising:

directing skip fire operation of the engine in which some working cycles are fired working cycles that are fueled and fired and other working cycles are skipped working cycles that are not fired;

while the engine is operating in a skip fire manner within a first operational region, directing valve actuation such the skipped working cycles that occur during the skip fire operation within the first operational region function as air springs; and while the engine is operating in a skip fire manner within a second operational region that is different than the first operating region, directing valve actuation such that the skipped working cycles that occur during operation within the second operation region function as low pressure exhaust springs.

24. A method as recited in claim 23 wherein the first operational region is based at least in part on cylinder load.

25. A method as recited in claim 23 wherein the first operational region is a region of a cylinder load map below an air spring threshold line.

26. A method as recited claim 23 wherein the first operational region includes lower cylinder loads than the second operational region.

27. A method of operating an engine having a crankshaft, an intake manifold, and a plurality of working chambers, the method comprising, during operation of the engine:

deactivating all of the working chambers in response to a no engine torque request such that all of the working chambers are skipped through successive working cycles and no air is pumped through the working chambers as the crankshaft rotates; and operating each of the plurality of working chambers with an air spring or high pressure exhaust spring type gas spring for at least one working cycle of the skipped working cycles.

28. An engine controller configured to operate an internal combustion engine having a plurality of cylinders in a skip fire manner comprising:

a fire/skip sequence generator, wherein the fire/skip sequence generator generates a sequence of skip/fire decisions and for each skip decision determines a type of gas spring associated with the skip.

29. An engine controller as recited in claim 28 wherein the type of gas spring is selected from a group consisting of a low pressure exhaust spring, a high pressure exhaust spring, and an air spring.

30. An engine controller as recited in claim 28 wherein the type of gas spring is selected based at least in part on optimizing fuel efficiency.

31. An engine controller as recited in claim 28 wherein the type of gas spring selected is based at least in part on reducing NVH to an acceptable level.

32. An engine controller as recited in claim 28 wherein the type of gas spring is selected on a skipping opportunity by skipping opportunity basis.

33. An engine controller as recited in claim 28 wherein for each firing the fire/skip sequence generator determines whether the firing has a high output or low output.

34. An engine controller as recited in claim 28 wherein the fire/skip sequence generator uses a short-horizon optimization algorithm to determine a fire/skip sequence and the type of gas spring associated with skipped working cycles in the fire/skip sequence.

35. An engine controller as recited in claim 34 wherein the short-horizon optimization algorithm includes in the optimization criteria fuel economy and NVH associated with the fire/skip sequence.

36. An engine controller as recited in claim 28 wherein in response to a request for no torque from the internal combustion engine the fire/skip sequence generator generates a series of sequential skips and at least some of these skips use a high pressure exhaust spring or an air spring.

37. A computer readable storage medium that includes executable computer code embodied in a tangible form and suitable for operating an internal combustion engine in a skip fire manner that is fuel efficient and has acceptable noise, vibration and harshness (NVH) characteristics, wherein the computer readable medium includes:

executable computer code for generating a fire/skip sequence to deliver a desired torque, wherein the fire/skip sequence includes a type of gas spring associated with each skipped firing opportunity.

38. A computer readable storage medium as recited in claim 37 wherein the gas spring is selected from a group consisting of a low pressure exhaust spring, a high pressure exhaust spring, and an air spring.

* * * * *

UNITED STATES PATENT AND TRADEMARK OFFICE
CERTIFICATE OF CORRECTION

| | |
|---|---|
| PATENT NO. | : 10,619,584 B2 |
| APPLICATION NO. | : 15/982406 |
| DATED | : April 14, 2020 |
| INVENTOR(S) | : Fuschetto et al. |

It is certified that error appears in the above-identified patent and that said Letters Patent is hereby corrected as shown below:

In the Claims

Claim 26 (Column 17, Line 56) insert --in-- after --recited--.

Signed and Sealed this
Seventh Day of July, 2020

Andrei Iancu
*Director of the United States Patent and Trademark Office*